No. 752,826. PATENTED FEB. 23, 1904.
C. C. DESCHENES.
TIRE REPAIRER.
APPLICATION FILED FEB. 11, 1903.
NO MODEL.
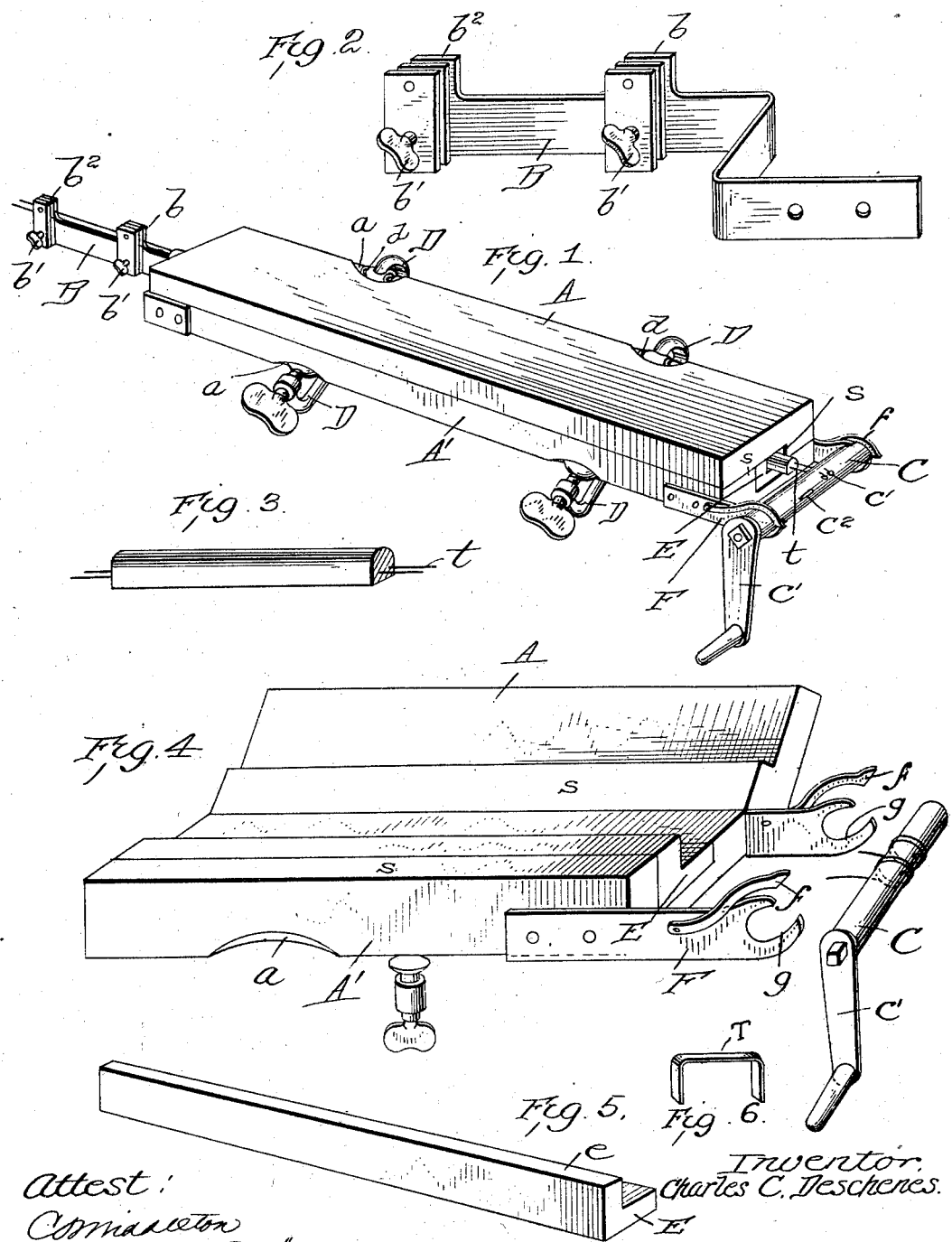

No. 752,826. Patented February 23, 1904.

UNITED STATES PATENT OFFICE.

CHARLES C. DESCHENES, OF FALL RIVER, MASSACHUSETTS.

TIRE-REPAIRER.

SPECIFICATION forming part of Letters Patent No. 752,826, dated February 23, 1904.

Application filed February 11, 1903. Serial No. 142,905. (No model.)

*To all whom it may concern:*

Be it known that I, CHARLES C. DESCHENES, a citizen of the United States, residing at Fall River, county of Bristol, and State of Massachusetts, have invented certain new and useful Improvements in Tire-Repairers, of which the following is a specification.

This invention relates to the repair of vehicle-tires, and more particularly to that class of rubber tires containing embedded retaining wires or straps. In repairing this class of tires it is necessary frequently to remove these wires or straps and insert new ones, and, in fact, this must be done whenever the tire has to be repaired. In consequence of rust and corrosion between the parts this removal is usually a matter of considerable difficulty, and it is often even necessary to cut the tire into several sections before the wires can be completely removed.

It is the object of my invention, therefore, to provide means for positively and easily withdrawing such wires and to afford means for the ready insertion of new wires to take their place. This insertion of new wires is also a matter of difficulty in an old tire made rough by corrosion and rust from the old wire.

It has been heretofore usual to hold one end of a tire in a clamp and to draw the wire therefrom by hand, cutting the same in sections, as stated above, whenever the wire refuses to yield further. To overcome the longitudinal yielding of the rubber, which forms one of the most serious obstacles in this operation, I provide a long clamp adapted to hold the same firmly and evenly throughout its entire length. In actual practice this clamp is usually twelve feet or more in length or as long as the circumference of the largest wheel to be repaired. On this clamp I mount a small winch for winding out the wire and a welding or brazing clamp for uniting a new wire to that which is to be withdrawn. By this means I secure the advantages hereinbefore set forth as desirable and overcome the faults and difficulties stated.

Figure 1 is a general view of my extracting device. Fig. 2 is a detail of the yielding clamp. Fig. 3 indicates a section of tire. Fig. 4 is a view of the clamping-frame open and a detail of the winch. Fig. 5 shows a removable clamping-section. Fig. 6 is a clip for holding a tire in position.

In the drawings, in which like letters indicate corresponding parts throughout, A A' are clamping members having internal shoulders $s\ s$. These clamping members may be separate or loosely hinged together, as by leather straps, and are pressed into diagonal engagement by any means, as by clamps D, which bear upon flattened sections $a$ on opposite edges at intervals along the tire-clamping members. One or both of these clamping members A A' may be supplied with a removable section E, by which the clamp is adapted to tires of different sizes. These strips E consist merely of sections having shoulders $e$ made in varying thickness to enlarge or diminish the space between the shoulders $s\ s$, and a recess is formed in one or both of the members into which these strips fit. The clamps are preferably hinged at one end, as at $d$, to the upper section A, so that they may be readily swung out of the way, and when the upper section A is open hang down to help hold it in that position.

F represents bearings mounted upon the lower clamping member, having forked end portions $g$, in which the spindle C is mounted to turn by the crank C'. Latches $f\ f$ retain the spindle in place. The spindle C is pierced by holes $c'$ and a slot $c^2$. If wires are to be withdrawn, they are passed through the holes, while if a strap is used as a tire-retainer the spindle is shoved over until the slot is in alinement with the strap, and it is then inserted in the slot, the end bent over, and the handle turned to draw and wind the wire or strap.

B is a bracket mounted at the other end of the clamping member A'. Upon this are small clamping-sections $b$, tightened by clamping-screws $b'$, between which wires may be held with their ends in contact for the purpose of uniting them by brazing or welding.

The operation of the device is as follows: The tire to be repaired is cut from the wheel by clipping the retaining-wires and the damaged section is cut from the end. In case there is more than one damaged section they are cut out bodily and the parts allowed to be slipped along until their ends abut, new sections of the tire being run on to take the place of those removed. The tire is then laid in the clamping member, a suitable shoulder-section E having been inserted. In case the tire is bent or twisted it is laid on the lower clamping member and held straight and in place by an inverted-U-shaped clip T, which slips over the inner edge of the tire and the outer edge of the lower clamping member, thus holding the tire in place against the shoulder s. The top of the tire-clamp A is now closed and pressure-clamps D swung into place and tightened up. The ends of the wires t, which have been bared by cutting away the damaged parts of the tire, are now inserted into the spindle of the winch and the handle turned to draw them out of the tire. If, as is usual, it is desirable to replace the old wires by new, the ends of the old wires are held in the clamps b and the ends of the new wires in the adjoining clamps $b^2$. These are then brazed together, and upon the withdrawal of the old wires the new will be at the same time introduced. If it should be desired, the brazing-bracket B may have substituted for it an electric welding-bracket and clamps and the ends of the wires may be thereby welded or any other form of welding or brazing bracket may be used without departing from the spirit of my invention.

This device of course may be used for drawing wires from other articles than tires and from other substances than rubber, but is particularly adapted for operation upon rubber vehicle-tires.

Various changes may be made in form and details of structure without departing from the spirit of my invention.

What I therefore claim, and desire to secure by Letters Patent, is—

1. In a device for repairing tires, the combination of two clamping members having internal opposing shoulders, and means for exerting a diagonal pressure upon said members.

2. In a device for repairing tires, the combination of two members having internal opposing shoulders, means for exerting a diagonal pressure on said clamping members, and means for withdrawing a wire from a tire clamped therebetween.

3. In a device for repairing tires, the combination of a tire-holding clamp, means for withdrawing a wire from a tire mounted upon one end of said tire-holding clamp, and a set of clamps mounted upon the opposite end of said tire-holding clamp, for holding the one end of a new wire against the end of that in a tire, while the same are brazed or welded together.

In testimony whereof I affix my signature in presence of two witnesses.

CHARLES C. DESCHENES.

Witnesses:
CHARLES E. BOIVIN,
ALBERT BLAIS.